(12) United States Patent
Gauchel (10) Patent No.: US 11,754,039 B1
(45) Date of Patent: Sep. 12, 2023

(54) LOAD DEPENDENT AUTONOMOUS YAW CONTROL FOR A WIND TURBINE

(71) Applicant: General Electric Renovables Espana, S.L., Barcelona (ES)

(72) Inventor: Peter Gauchel, Salzbergen (DE)

(73) Assignee: General Electric Renovables Espana, S.L., Barcelona (ES)

(*) Notice: Subject to any disclaimer, the term of this patent is extended or adjusted under 35 U.S.C. 154(b) by 0 days.

(21) Appl. No.: 17/889,725

(22) Filed: Aug. 17, 2022

(51) Int. Cl.
*F03D 7/02* (2006.01)

(52) U.S. Cl.
CPC .... *F03D 7/0204* (2013.01); *F05B 2270/1095* (2013.01); *F05B 2270/32* (2013.01); *F05B 2270/321* (2013.01); *F05B 2270/329* (2013.01); *F05B 2270/331* (2013.01)

(58) Field of Classification Search
CPC ............ F03D 7/0204; F05B 2270/1095; F05B 2270/32; F05B 2270/321; F05B 2270/329; F05B 2270/331
See application file for complete search history.

(56) References Cited

U.S. PATENT DOCUMENTS

| | | | |
|---|---|---|---|
| 7,095,129 B2* | 8/2006 | Moroz | F03D 7/0268 290/55 |
| 7,160,083 B2* | 1/2007 | Pierce | F03D 17/00 416/61 |
| 7,445,420 B2 | 11/2008 | Yoshida | |
| 7,728,452 B2 | 6/2010 | Arinaga et al. | |
| 8,100,628 B2 | 1/2012 | Frese et al. | |
| 8,680,700 B2 | 3/2014 | Gomez De Las Heras Carbonell et al. | |
| 8,749,084 B2 | 6/2014 | Gjerlov et al. | |
| 9,371,819 B2 | 6/2016 | Grabau | |
| 9,416,771 B2 | 8/2016 | Obrecht et al. | |
| 9,562,515 B2* | 2/2017 | Honhoff | F03D 7/0204 |
| 10,871,144 B2 | 12/2020 | Tomas et al. | |
| 10,954,917 B2 | 3/2021 | Oing et al. | |
| 2004/0151577 A1* | 8/2004 | Pierce | F03D 17/00 415/4.1 |
| 2006/0001268 A1* | 1/2006 | Moroz | F03D 7/0272 290/44 |
| 2006/0002792 A1* | 1/2006 | Moroz | F03D 7/0292 416/1 |
| 2009/0066089 A1 | 3/2009 | Arinaga et al. | |

(Continued)

FOREIGN PATENT DOCUMENTS

EP 3150850 A1 4/2017

*Primary Examiner* — Eldon T Brockman
(74) *Attorney, Agent, or Firm* — Dority & Manning, P.A.

(57) ABSTRACT

The present application discloses novel systems and methods for yawing an autonomous wind turbine. In an embodiment, the wind turbine includes a control system configured to determine a control action signal for a yaw drive mechanism of the wind turbine as a function of the wind condition(s) and as a function of the load condition(s). The control system is configured to monitor change(s) associated with the load condition(s) to determine if the load condition(s) is too high for too long, or in need of attention, before yawing of the wind turbine is initiated or, if the load condition(s) are getting too high, after yawing has been initiated. In another embodiment, the control system includes a load sensor system with proximity sensors arranged adjacent, on, and/or about the main shaft flange of the nacelle or on the rotor blades of the wind turbine.

16 Claims, 6 Drawing Sheets

(56) References Cited

U.S. PATENT DOCUMENTS

| | | |
|---|---|---|
| 2009/0081041 A1 | 3/2009 | Frese et al. |
| 2011/0144949 A1 | 6/2011 | Siew et al. |
| 2014/0219795 A1* | 8/2014 | Honhoff ............... F03D 7/0296 416/9 |
| 2015/0337802 A1 | 11/2015 | Su et al. |
| 2019/0072082 A1 | 3/2019 | Lysgaard et al. |
| 2021/0123413 A1* | 4/2021 | Vaddi ..................... F03D 7/042 |

* cited by examiner

LOAD DEPENDENT AUTONOMOUS YAW CONTROL FOR A WIND TURBINE

FIELD

The present disclosure relates in general to wind turbines, and more particularly to improved autonomous yaw control for wind turbines.

BACKGROUNDS

Wind power is considered one of the cleanest, most environmentally friendly energy sources presently available, and wind turbines have gained increased attention in this regard. A modern wind turbine typically includes a nacelle fixed atop a tower, a generator and a gearbox housed with the nacelle, and a rotor configured with the nacelle having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Conventional wind turbines also include a turbine controller for controlling operation thereof.

In addition, at least some known nacelles include a yaw system for controlling a perspective of the rotor relative to a direction of wind. Such wind turbines also typically include sensors for sensing a direction of the wind. Such yaw systems generally include a yaw bearing, a plurality of yaw drives that operate to rotate the yaw bearing, and a controller. The controller, therefore, is configured to control the yaw system to adjust the yaw of the nacelle via the yaw system based on the sensed wind direction. In other words, start and stop of the yaw system depends only on wind direction changes. In particular, once the turbine controller determines a deviation of the rotor position to the wind direction, the yaw system starts to operate which can include disengaging the motor brakes and/or reducing the yaw brake torque until the rotor is aligned to the wind direction again. At this point, the yaw system will be stopped and one or more yaw brakes secure the yaw drives in place to maintain the rotor at the desired orientation.

As such, wind turbine sites with extreme wind speed conditions (e.g., typhoons) often rely on the yaw system to align the rotor to the wind in the high wind conditions. Being able to yaw the rotor to the wind is important especially for turbines equipped with yaw power backup systems. For example, as loads on the yaw system can be very high in extreme wind conditions, the yaw drives need to be robust to allow yawing/aligning of the rotor to the wind in such extreme wind conditions. However, with increasing wind turbine sizes, robust yaw systems require a large number of yaw drives (e.g., greater than four), very large yaw drives, or both. However, integrating a high number of yaw drives and/or large yaw drives into the nacelle is a difficult and expensive process.

In addition, there are instances where the turbine controller may be offline, such as for example, during adverse grid or weather events, as well as regular maintenance. If the turbine controller is offline, there is no way to operate the yaw system. Without the yaw system, the wind turbine may be subjected to increased loads (e.g., asymmetric loads) that result from yaw misalignment which may contribute to significant fatigue cycles or high extreme loads on the wind turbine components. As the wind turbine components become worn, the wind turbine becomes less effective. In addition, wear on the components may adversely impact the machine life.

Accordingly, the present disclosure is directed to systems and methods that address the aforementioned issues. More specifically, the present disclosure is directed to systems and methods for controlling the yaw of the rotor that are not solely dependent on wind direction change.

BRIEF DESCRIPTION

Aspects and advantages of the present disclosure will be set forth in part in the following description, or may be obvious from the description, or may be learned through practice of the present disclosure.

In an aspect, the present disclosure is directed to a method for yawing an autonomous wind turbine, i.e., a wind turbine under autonomous control (defined in greater detail herein), or a wind turbine in other control modes. The wind turbine includes a rotor and a nacelle mounted atop a tower and a controller for implementing the autonomous control amongst other control functions. The method includes receiving, via the controller, a wind condition at the wind turbine. The method also includes determining, via the controller, whether the wind condition exceeds a wind condition threshold. The method also includes determining, via the controller, one or more bending moments acting on the wind turbine. The method also includes determining, via the controller, whether the one or more bending moments acting on the wind turbine exceed a load threshold. The method also includes activating, via the controller, one or more yaw drive mechanisms for yawing the rotor of the wind turbine when the wind condition exceeds the wind condition threshold and the one or more bending moments remain below the load threshold.

In another aspect, the present disclosure is directed to a method for autonomous yaw control of a wind turbine. The wind turbine has a nacelle mounted atop a tower and a yaw control system for yawing the nacelle. The method includes measuring, via one or more wind sensor, one or more wind conditions. The method also includes determining, via the controller, a control action signal for the yaw control system as a function of the one or more wind conditions, wherein the control action signal comprises a predetermined angular position for the nacelle. The method also includes measuring, via a load sensor system, one or more bending moments acting on the nacelle in at least one of a nodding direction or a yawing direction. The method also includes determining, via the controller, whether the one or more bending moments exceed a load threshold. The method also includes controlling, via the controller, the yaw control system based on the control action signal for as long as the one or more bending moments remain below the load threshold.

BRIEF DESCRIPTION OF THE DRAWINGS

A full and enabling disclosure, including the best mode thereof, directed to one of ordinary skill in the art, is set forth in the specification, which makes reference to the appended figures, in which.

Repeat use of reference characters in the present specification and drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

In general, the present disclosure is directed to a system and method for autonomous yaw control for wind turbines. In particular, the present disclosure is directed to systems and methods for load-dependent autonomous yaw control for a wind turbine. In an embodiment, for example, the system includes a control system—centralized and/or distributed—having a main controller and/or a plurality of distributed secondary controllers (such as one or more input and output (I/O) modules distributed throughout the wind turbine). The control system is also communicatively coupled to various sensors for sensing one or more wind conditions and one or more load conditions acting on the wind turbine.

In this way, the sensor(s) are configured to monitor changes associated with the wind conditions (e.g., wind speed, wind direction, wind turbulence, wind shear, wind fronts, etc.) and one or more changes associated with load conditions (e.g., bending moments acting on the nacelle and the structure supporting the rotor of the wind turbine in at least one of a nodding direction and a yawing direction). Sensor signals associated with the change(s) are then transmitted to the control system. The control system then analyzes the sensor signals and generates output signals in response to circumstances where the change(s) associated with the wind conditions and the load conditions are optimal, sufficient, and/or conducive for efficient, sustainable, and safe yaw control.

For example, in an embodiment, the control system is configured to determine a control action signal for a yaw drive mechanism of the wind turbine as a function of the wind condition(s) and as a function of the load condition(s). The control system includes a module having a preprogrammed control scheme stored therein that is configured to control various wind turbine components. Therefore, in the embodiment, the control system is configured to monitor change(s) associated with the load condition(s) by at least: (1) receiving the sensor signal(s) from the load sensor(s) that are indicative of change(s) associated with the load condition(s); and (2) comparing the change(s) associated with the load condition(s) to certain thresholds to determine if the load condition(s) is too high for too long, or in need of attention, before yawing of the wind turbine is initiated or, if the load condition(s) are getting too high, after the yawing has been initiated. The control system controls the yaw system based on the control action signal.

For example, in an embodiment, the control system includes a load sensor system configured as an asymmetric load control (ALC) system with proximity sensors arranged adjacent, on, and/or about the main shaft flange of the nacelle. Alternatively load sensors may be situated on the rotor blades of the wind turbine. The ALC system is configured to monitor the load(s) translated from the wind onto the rotor to the rotor hub and through the wind turbine, to be dealt with by the yaw system components (e.g., the yaw drives) before, during, and after a yaw event. In such embodiments, if the yaw moment or yaw torque exceeds a set Newton-meter (Nm) threshold, the ALC system is configured to transmit the magnitude and direction of the sensor signal to the control system and to provide the length of the measured signal, as well as other context data. In an embodiment, for example, if the yaw moment exceeds about 2500 kNm for about ten seconds or longer, or if the yaw moment exceeds about 3500 kNm for about 3 seconds or longer, or if the yaw moment exceeds about 5000 kNm for about 1 second or longer, or any combination or range established based on the above, the ALC system transmits the magnitude, direction, and length of the sensor signal to the control system. Thus, the control system is configured to receive the sensor signal(s) indicative of the change(s) associated with the load condition. The control system also is configured to compare the change(s) associated with the yaw moment to the load threshold(s), and to implement a control action based on this comparison, so as to prevent or minimize damage to the yaw drives, other yaw system components, or the broader wind turbine.

A "control action" as used herein includes, but is not limited to: (1) if the wind speed exceeds a predetermined threshold, initializing and regulating the yaw system (e.g., the yaw drive mechanism(s) and/or yaw drive brake assemblies and/or the power thereto); (2) if the load conditions exceed a predetermined load threshold for a predetermined duration at a predetermined level of certainty for the sensor signal received, delaying initialization and/or down regulating use of the yaw system (e.g., the yaw drive mechanism(s) and/or yaw drive brake assemblies and/or the power thereto); and (3) initializing and regulating electromagnet current in the yaw brake assembly(ies) to better manage stress and loads acting on the yaw drive mechanism(s) during a yawing event.

In another embodiment, the control system is configured to have contingency autonomous control capabilities. In an illustrative example, the yaw system includes an auxiliary power supply comprising a brake power control device (e.g., such as a variable frequency drive), a braking unit coupled to the brake power control device, at least one energy storage device coupled to the braking unit, a plurality of yaw drive mechanisms communicatively coupled to the auxiliary power supply via a communication link, and sub controller(s) configured to implement a protective control strategy.

In particular, in an autonomous control embodiment, each of the yaw drive mechanisms includes a yaw control device configured to implement a protective control strategy for the yaw system in response to the yaw system components experiencing a failure. If the main control system experiences a failure, the yaw control device(s) are each configured and programmed to take control of the yaw drive mechanisms and to operate the yaw system without interruption and to implement the processes and methods of the present disclosure.

A "protective control strategy" as used herein includes, but is not limited to, the control actions described herein, amongst: (1) if any one of the yaw drive mechanism experiences a failure, isolating the path of the yaw drive mechanism experiencing the failure and maintaining operation of remaining yaw drive mechanisms; (2) if one or more of the yaw control device(s) experiences a failure, isolating the path of the yaw power control device(s) experiencing the failure and maintaining operation of remaining yaw power control device(s) with equal automatic load sharing spread over the balance of the working units; (3) if one of a dynamic brake resistors experiences a failure, automatically falling back to other dynamic brake resistor that is not experiencing the failure without interruption and continuing the operation of the yaw system without interruption; (4) if a brake chopper experiences a failure, absorbing the excess energy of the yaw system into the auxiliary power supply via an energy storage device(s) and/or diverting the energy to a hydraulic pump used in the system for dissipation; (5) if one of a battery charger(s) experiences a failure, automatically falling back to the other battery charger(s) that are not experiencing the failure and operating the yaw system without interruption; (6) if one of a battery unit(s) experiences a failure, automatically falling back to the other battery unit(s) that are not experiencing the failure and operating the yaw system without interruption; (7) monitoring, via at least one of a turbine controller or the yaw power control devices, the yaw system for failures and, in response to detecting a failure, determining whether the failure is critical or non-critical (if a failure is critical, implementing via the yaw control device(s) the protective control strategy for the yaw system and, alternatively, if the failure is non-critical, implementing, via the broader controller, the protective control strategy for the yaw system).

In another embodiment, the critical failures are those failures generally located in the broader control system, the auxiliary power supply, a filter unit of the auxiliary power supply, or a power path to the nacelle. Alternatively, non-critical failures are generally located in the braking units, one of the energy storage devices, one of the yaw drive mechanisms, or one of the yaw brake assemblies, or the communication link.

In another embodiment, if the broader control system (i.e., main controller) or the communication link(s) experience a failure, the protective control strategy includes controlling the remaining yaw system components via one or more distributed I/O modules communicatively coupled to the main controller. In such a configuration, the distributed I/O module(s) have a preprogrammed control scheme stored therein that is configured to control various wind turbine components when the main controller is offline.

More specifically, in an embodiments, the distributed I/O modules receive, from a wind sensor, one or more wind condition signals, and one or more load conditions. The distributed I/O modules also determine a control action signal for the yaw system of the wind turbine as a function of the one or more wind conditions and the one or more load conditions. The distributed I/O modules then autonomously control the yaw system based on the control action signal.

Figure 1:
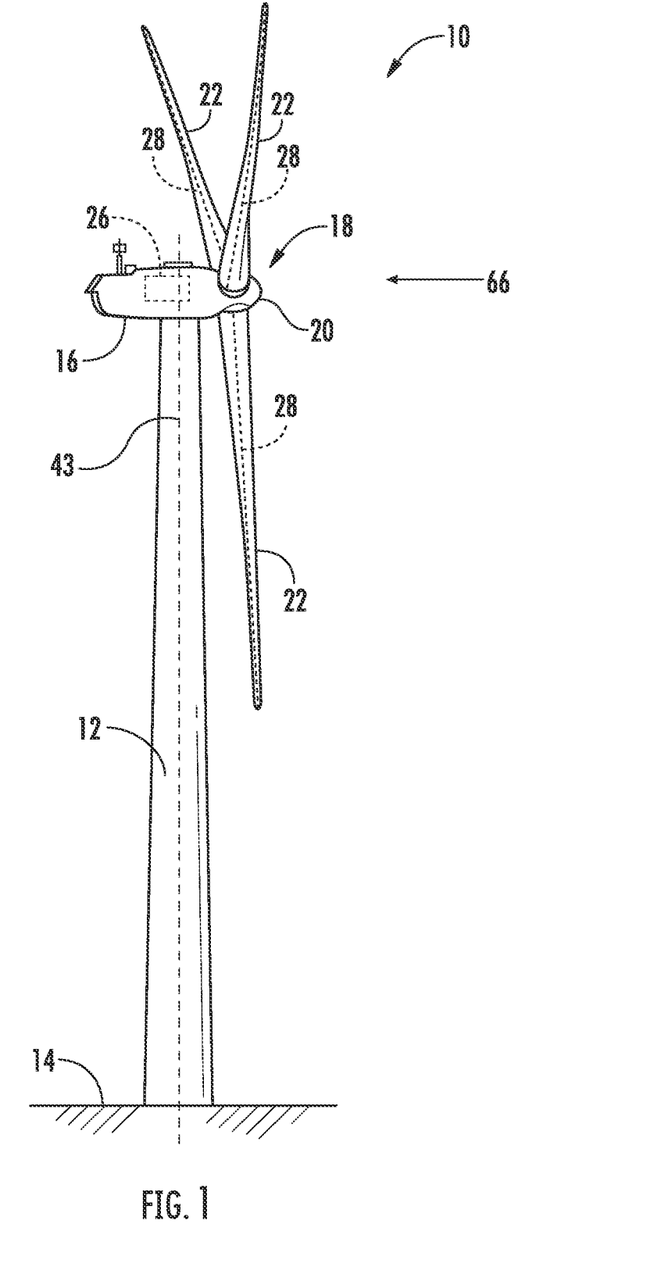
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
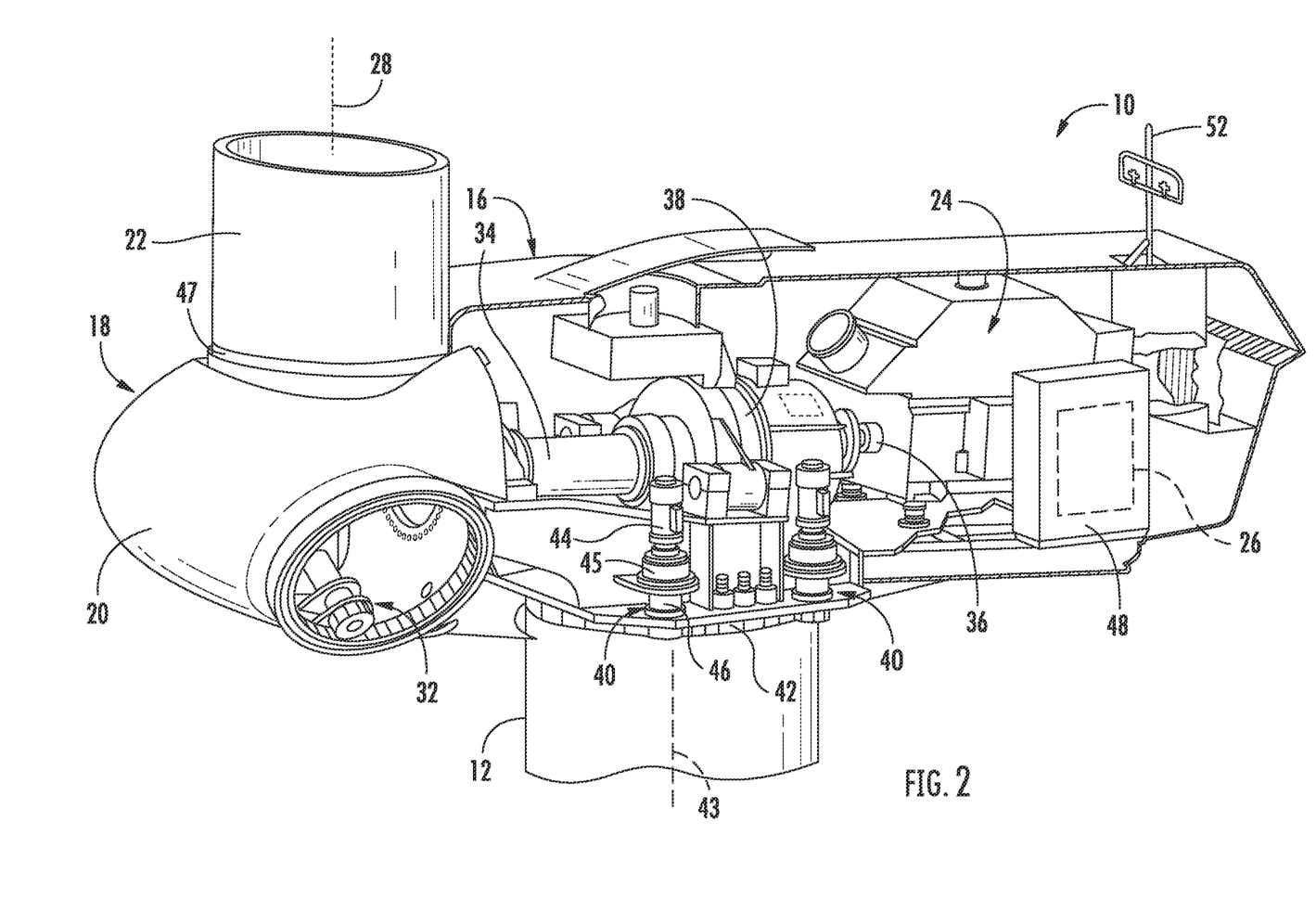
FIG. 2 illustrates a simplified, internal view of one embodiment of a nacelle according to the present disclosure.

The wind turbine 10 may also include a wind turbine controller 26 centralized within the nacelle 16. For example, as shown, the turbine controller 26 is located in the top box cabinet 48 (FIG. 2). However, in other embodiments, the controller 26 may be located within any other component of the wind turbine 10 or at a location outside the wind turbine 10. Further, the controller 26 may be communicatively coupled to any number of the components of the wind turbine 10 or be distributed in order to control the operation of such components and/or implement a control action or a protective control strategy. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control action signals, receiving and analyzing sensor signals, and generating message signals to provide an indication of changes to the wind conditions and/or load conditions or to relative position changes/yaw directions of the wind turbine. In one possible configuration, the controller 26 may be configured to control pitch and speed regulation of the blades, high-speed shaft and yaw brake application, yaw and pitch motor application, and fault monitoring.

By transmitting and executing wind turbine control action signals, the turbine controller 26 may generally be configured to control the various operating modes (e.g., start-up or shut-down sequences) and/or components of the wind turbine 10. For example, the controller 26 may be configured to control the yaw direction of the nacelle 16 about a yaw axis 43 to position the rotor blades 22 with respect to the direction 66 of the wind, thereby controlling the power output generated by the wind turbine 10. For example, as is described in greater detail herein, the turbine controller 26 may be configured to transmit control action signals/commands to one or more yaw drive mechanisms 40 (FIG. 2) of the wind turbine 10 such that the nacelle 16 may be rotated about the yaw axis 43.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The rotor shaft 34 usually comprises a flange 35 that facilitates mechanical engagement of the rotor shaft 34 to the hub 20. The gearbox 38 opposite the hub 20 may then be configured to convert the low speed, high torque input to a high speed, low torque output to drive the generator shaft 36 and, thus, the generator 24.

The nacelle 16 may include a yaw drive mechanism 40 configured to change the angle of the nacelle 16 relative to the wind (e.g., by engaging a yaw bearing 42 of the wind turbine 10 that is arranged between the nacelle 16 and the tower 12 of the wind turbine 10). Further, each yaw drive mechanism 40 may include a yaw drive motor 44 (e.g., any suitable electric or hydraulic motor), a yaw drive gearbox 45, and a yaw drive pinion 46. In such embodiments, the yaw drive motor 44 may be coupled to the yaw drive gearbox 45 so that the yaw drive motor 44 imparts mechanical force to the yaw drive gearbox 45. Similarly, the yaw drive gearbox 45 may be coupled to the yaw drive pinion 46 for rotation therewith. The yaw drive pinion 46 may, in turn, be in rotational engagement with the yaw bearing 42 coupled between the tower 12 and the nacelle 16 such that rotation of the yaw drive pinion 46 causes rotation of the yaw bearing 42. Thus, in such embodiments, rotation of the yaw drive motor 44 drives the yaw drive gearbox 45 and the yaw drive pinion 46, thereby rotating the yaw bearing 42 and the nacelle 16 about the yaw axis 43. Similarly, the wind turbine 10 may include one or more pitch adjustment mechanisms 32 communicatively coupled to the wind turbine controller 26, with each pitch adjustment mechanism(s) 32 being configured to rotate the pitch bearing 47 and thus the individual rotor blade(s) 22 about the pitch axis 28.

In addition, the wind turbine 10 may also include one or more sensors 52 for monitoring various wind conditions of the wind turbine 10 and one or more sensor 37 for sensing load conditions acting on the wind turbine. For example, as shown in FIG. 2, the wind direction, wind speed, or any other suitable wind condition near of the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices), Meteorological (Met) Mast systems, or any other in situ or remote sensing device(s) or system(s) that can provide weather, pressure, or wind information now known or later developed in the art. Moreover, as shown in FIG. 2, the bending moments acting on the nacelle 16—in at least one of a nodding direction and a yawing direction— translated through the individual rotor blade(s) 22 to the hub 20 and through the rotor shaft 34 of the rotor 18 may be measured, such as through use of a suitable ALC sensor system 37. An ALC sensor system 37 includes, for example, one or more proximity sensors 39 situated at or near (or within measurement distance) of the interface of the rotor shaft flange 35 and the hub 20, or any other configuration which can provide load condition information, now known or later developed in the art.

Figure 3:
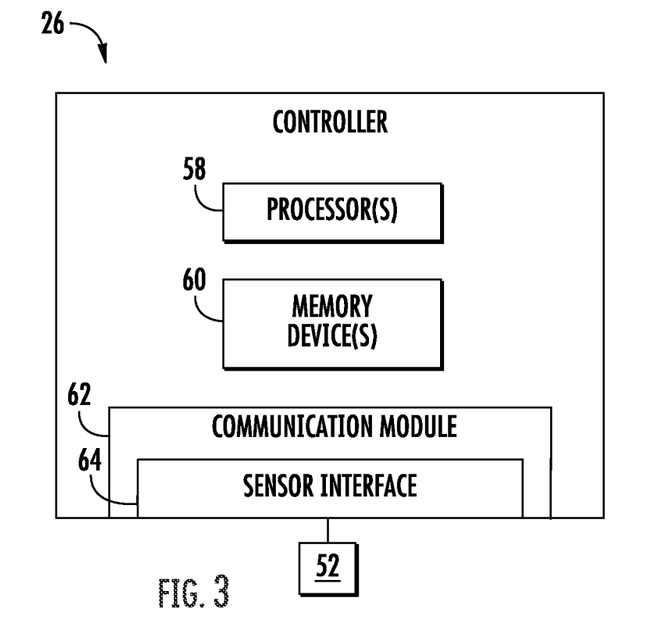
FIG. 3 illustrates a schematic diagram of one embodiment of a main controller according to the present disclosure.

Referring now to FIG. 3, a block diagram of one embodiment of a controller 26 according to the present disclosure is illustrated. As shown, the controller 26 may include a computer or other suitable processing unit that may include suitable computer-readable instructions that, when implemented, configure the controller 26 to perform various different functions, such as receiving, transmitting and/or executing wind turbine control action signals. More specifically, as shown, there is illustrated a block diagram of one embodiment of suitable components that may be included within the controller 26 in accordance with example aspects of the present disclosure. As shown, the controller 26 may include one or more processor(s) 58 and associated memory device(s) 60 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller 26 to perform various functions as described herein. Additionally, the controller 26 may also include a communications interface 62 to facilitate communications between the controller 26 and the various components of the wind turbine 10. An interface can include one or more circuits, terminals, pins, contacts, conductors, or other components for sending and receiving control action signals. Moreover, the controller 26 may include a sensor interface 64 (e.g., one or more analog-to-digital converters) to permit signals transmitted from the sensors to be converted into signals that can be understood and processed by the processors 58.

Figure 4:
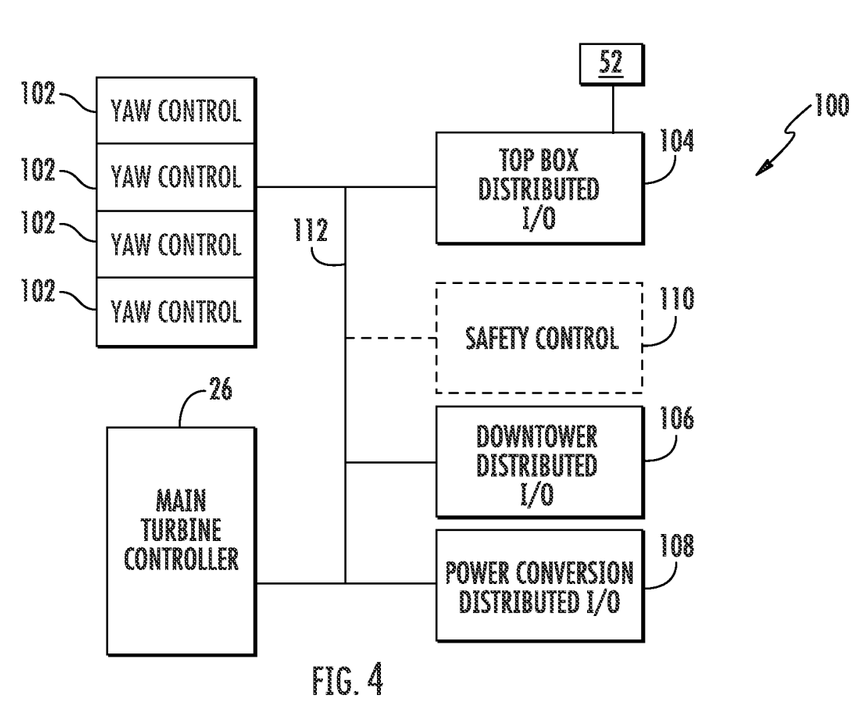
FIG. 4 illustrates a schematic diagram of one embodiment of a distributed control system according to the present disclosure.

Referring now to FIG. 4, a block diagram of one embodiment of a distributed control system 100 for a wind turbine according to the present disclosure is illustrated. As shown, the control system 100 includes the main wind turbine controller 26 and a plurality of distributed input and output (I/O) modules 104, 106, 108 for individual control of one or more wind turbine components. More specifically, as shown in the illustrated embodiment, the control system 100 includes a top box distributed I/O 104, a downtower distributed I/O 106, and a power conversion distributed I/O 108. Further, as shown, each of the distributed I/O modules 104, 106, 108 are connected to the main turbine controller 26 via a communications networks 112 for command and monitoring. It should be understood that the communications network 112 as described herein may include any suitable communication medium for transmitting the signals. For instance, the communications network 112 may include any number of wired or wireless links, including communication via one or more Ethernet connections, fiber optic connections, network buses, power lines, conductors, or circuits for transmitting information wirelessly. Further, signals may be communicated over the communications network 112 using any suitable communication protocol, such as a serial communication protocol, broadband over power line protocol, wireless communication protocol, or other suitable protocol.

Thus, in this embodiment, the turbine controller 26 is configured to receive information from the input modules and send information to output modules. The inputs and outputs can be either analog signals which are continuously changing or discrete signals. More specifically, in certain embodiments, the top box distributed I/O 104 is configured to provide I/O to the turbine controller 26 so as to control uptower components of the wind turbine 10, e.g., the yaw drive mechanism 40. Similarly, the downtower distributed I/O 106 is configured to provide I/O to the turbine controller 26 so as to control the downtower electrical assembly, e.g., transformers, etc. The power conversion distributed I/O 108 is configured to provide I/O to the turbine controller 26 so as to control the power converter of the wind turbine 10. In addition, the control system 100 may optionally include one or more independent safety controllers 110 configured to protect the various components of the control system 100. In still additional embodiments, the control system 100 may include more or less distributed I/O modules than those depicted in FIG. 4 depending on the specific components of the wind turbine 10.

The control system 100 also includes one or more yaw control systems 102 configured to control the yaw angle of the wind turbine. For example, as shown, the control system 100 includes four yaw control systems 102, i.e., one for each of the four yaw drive mechanisms 40 rotor blades 22 of the wind turbine 10 of FIG. 1. As such, in additional embodiments, the control system 100 may also have more than four or less than four yaw control systems 102. During normal operation, the modules 104, 106, 108 of the control system 100 are configured to operate autonomously so as to protect to the wind turbine 10 from increased stresses or load.

Figure 5:
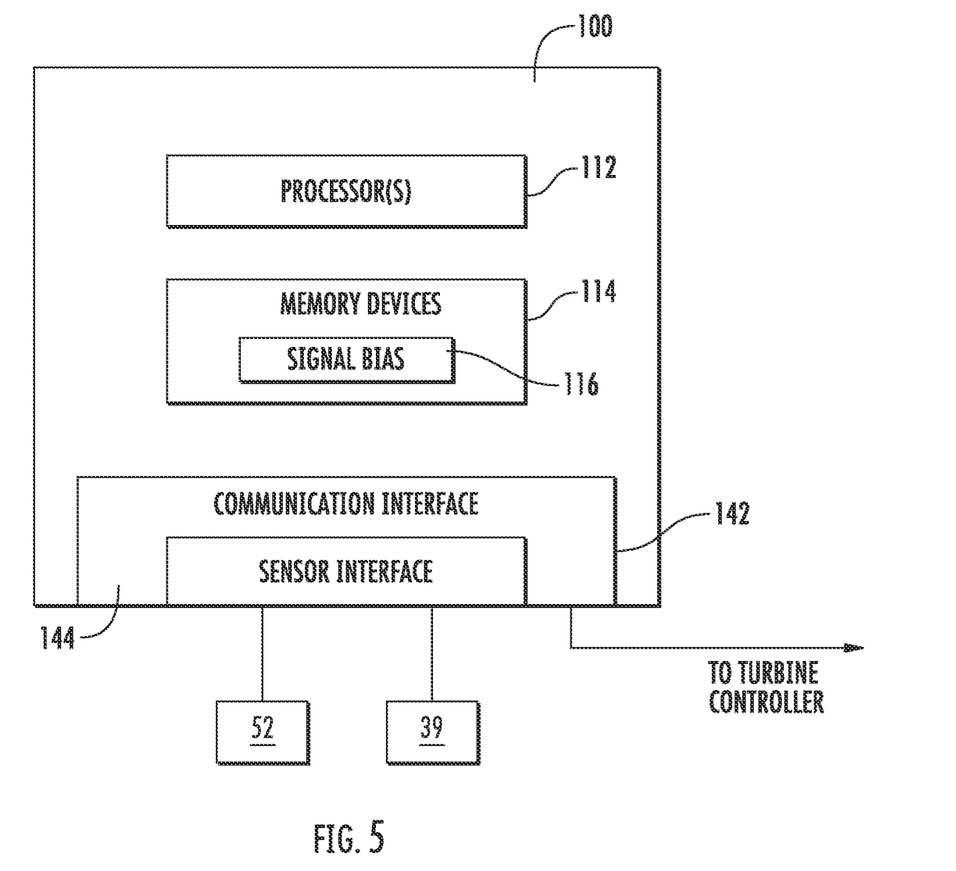
FIG. 5 illustrates a block diagram of one embodiment of a distributed control module according to the present disclosure.

For example, in certain embodiments, one or more of the modules 104, 106, 108 of the control system 100 may include a computer or other suitable processing unit that may include suitable computer-readable instructions that, when implemented, configure the modules 104, 106, 108 to perform various different functions, such as receiving, transmitting and/or executing wind turbine control action signals. More specifically, as shown in FIG. 5, there is illustrated a block diagram of one embodiment of suitable components that may be included within the modules 104, 106, 108 in accordance with example aspects of the present disclosure. As shown, the modules 104, 106, 108 may include one or more processor(s) 113 and associated memory device(s) 114 configured to perform a variety of computer-implemented functions (e.g., performing the methods, steps, calculations and the like disclosed herein).

Such memory device(s) 114 may generally be configured to store suitable computer-readable instructions that, when implemented by the processor(s) 113, configure the modules 104, 106, 108 to perform various functions as described herein. Additionally, the modules 104, 106, 108 may also include a communications interface 142 to facilitate communications between the modules 104, 106, 108 and the various components of the wind turbine 10. An interface can include one or more circuits, terminals, pins, contacts, conductors, or other components for sending and receiving control action signals, sensor signals, power regulation signals, etc. Moreover, the modules 104, 106, 108 may include a sensor interface 144 (e.g., one or more analog-to-digital converters) to permit signals transmitted from the sensors to be converted into signals that can be understood and processed by the processors 113.

Thus, in certain embodiments, the top box distributed I/O 104 can use different computer-readable instructions stored in a different language or protocol relative to the turbine controller 26. In this way, the top box distributed I/O 104 can be a standalone and separate device from the turbine controller 26. Moreover, the top box distributed I/O 104 (which already receives signals from the wind sensor 52) may include a control scheme or algorithm for controlling one or more wind turbine components, e.g., the yaw drive mechanism 40 of the wind turbine 10. In certain embodiments, the control scheme of the top box distributed I/O 104, when implemented thereby, is configured to provide autonomous yaw control of the wind turbine 10 regardless of whether the main controller 26 is online. Accordingly, in certain embodiments, the top box distributed I/O 104 is configured for sending control action signal(s) to the yaw drive motor such that the yaw drive motor imparts mechanical force to the yaw drive gearbox and the yaw drive gearbox drives the yaw drive pinion so as to rotate the yaw bearing and consequently, the nacelle about a yaw axis 43 as well as the methods and processes described herein.

Figure 6:
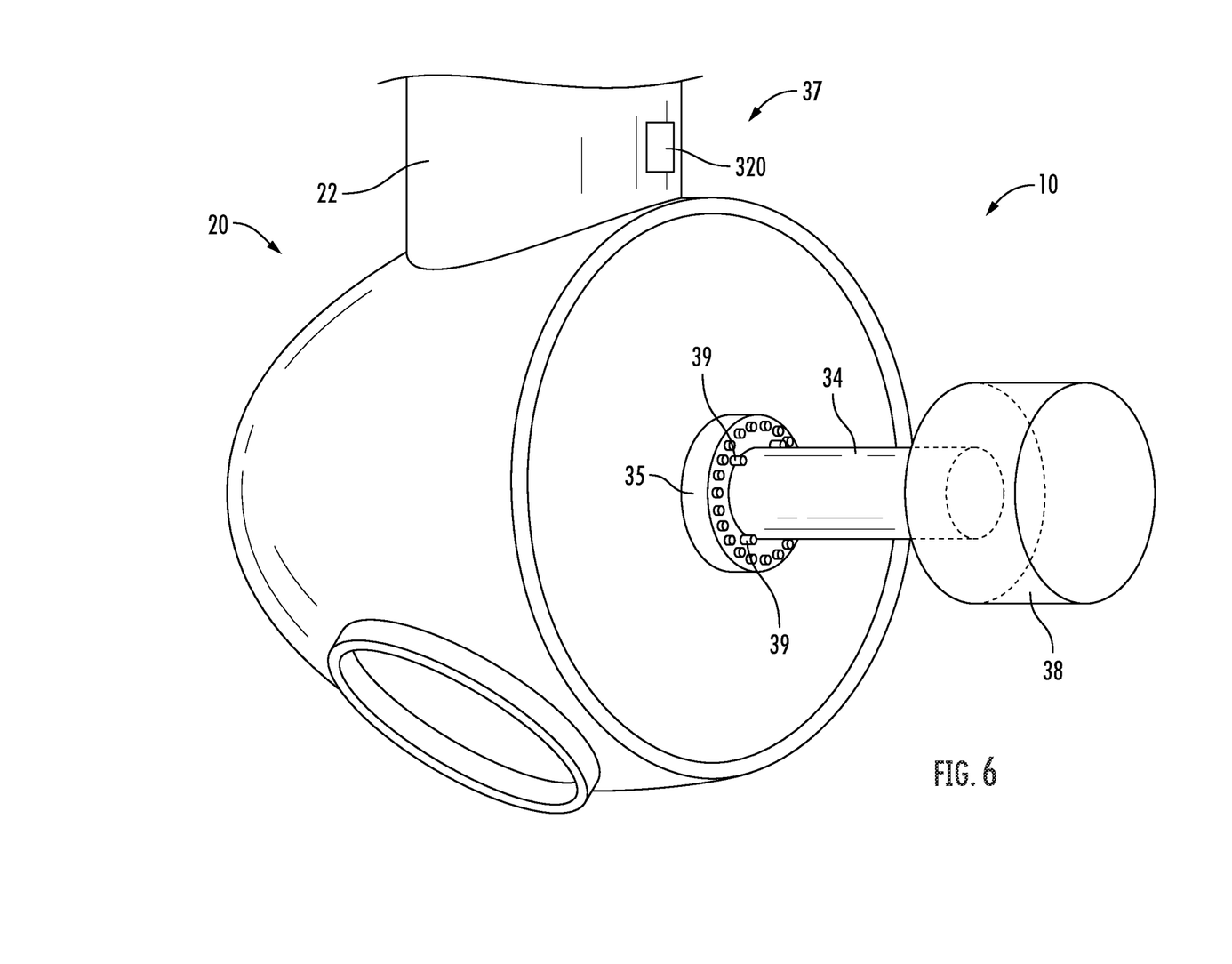
FIG. 6 illustrates a perspective view of one embodiment of a load sensor system according to the present disclosure.

Referring now to FIG. 6, the proximity sensor(s) 39 of the ALC sensor(s) 37 on the main rotor flange 35 are configured to monitor one or more changes associated with the bending moments in a nodding direction and/or a yawing direction. Tower nodding is usually caused by aerodynamic thrust and rotation of the rotor blades. Further, as a rotor blade passes in front of the tower, the thrust of the wind impinging on the tower decreases. Such continuous variation in wind force may induce oscillations in the tower. Moreover, if the rotor velocity is such that a rotor blade passes over the tower each time the tower is in one of its extreme positions (forward or backward), the tower oscillations may be amplified. Conventionally, the oscillations in the fore-aft direction are automatically minimized due to aerodynamic damping.

Shear applies forces to the blades and hub as well. Positive shear essentially transfers bending forces from the blades to the hub and shaft. The wind shear applies an asymmetric load across the rotor which results in a bending moment being transferred to the hub/shaft. Positive shear creates a nose-up bending moment and opposes gravity while negative shear creates a nose-down moment and compliments gravity. There is a limit to the amount of pitching the turbine is able to do to either overcome blade/hub forces or to compensate for gravity. Being able to adjust for dynamic conditions can reduce fatigue and other dynamic stresses on the shaft and blade/hub assembly, especially when the autonomous control system and extreme weather or load conditions are in play. Therefore, in certain embodiments, the sensor(s) 37 may be a distance sensor, a temperature sensor, a linear displacement sensor, a linear potentiometers, a string potentiometer, a position transducer, a linear position sensor, a laser position sensor, a gage sensor, and/or other contact and non-contact position sensor, or any other sensor or sensor system configured to infer one or more load conditions acting on and being translated through the components of the wind turbine 10.

Returning still to FIG. 6, a plurality of proximity sensors 39 may be situated and equally spaced circumferentially about the flange 35 and configured to sense the position change, shift, deflection, and/or displacement of the flange 35 relative to the hub 20 or any another component attached thereto. In the illustrated embodiment, for example, four proximity sensors 39 are illustrated. In other embodiments, less than four or more than four proximity sensors 39 may be used.

As such, in an embodiment, each of the proximity sensors 39 may be mounted on a sensor bracket that is attached to a non-rotating structure near the low-speed shaft main bearing 130. Thus, the proximity sensors 39 are configured to sense main shaft flange 35 displacement relative to a non-deflecting reference frame, i.e., the main bearing 130. Sensor readings from the proximity sensors 39, as well as any other sensor reading from the broader sensor system 37, can be leveraged by the autonomous control system 100 to determine a control action for the yaw control system 102.

In certain embodiments, the proximity sensors 39 may be rigidly mounted onto or near the main rotor flange 35 at any suitable location using any suitable means that allows the proximity sensors 39 to be maintained in proper positioning and orientation relative to the structural components of the wind turbine 10 they are monitoring. In certain configurations, the deflection of the hub 20 may displace the main shaft flange 35 from a predetermined resting or "no load" position. In certain other configurations, the proximity sensors 39 may be used to measure the displacement of the main shaft flange 35 relative to another non-deflecting reference frame, e.g., the bedplate or the housing of the low-speed shaft main bearing 130.

Referring still to FIG. 6, the sensor(s) 37 may include a plurality of blade sensors 320 located in, on, or near each of the rotor blades 22. The blade sensors 320 are configured to measure blade displacement, blade acceleration, and/or the load on the rotor blades 22. The blade displacement, blade acceleration, and/or blade load signals may then be translated into an indication of rotor load, wind shear, or a load imbalance, and these values may be translated into shaft moment set point correction values and shaft moment correction commands, for example.

The sensor(s) 37 are configured to be communicatively coupled to the turbine control system 100 such that output signals from the sensor(s) 37 may be transmitted to the turbine control system 100 and such that control action signals from the control system 100 may be transmitted to the sensor(s) 37. For example, as shown in the illustrated embodiment, the sensor(s) 37 may be communicatively coupled to the turbine control system 100 through a wired connection, such as by coupling the sensor 37 to the turbine control system 100 through a cable and/or other suitable communication link 146. As such, signals generated by the sensor(s) 37 may be directly transmitted to the turbine control system 100 for subsequent processing. However, in an alternative embodiment, the sensor(s) 37 may be communicatively coupled to the turbine control system 100 through a wireless connection. For instance, the sensor 37 may include or may be coupled to an antenna (not shown) configured to transmit suitable signals to the turbine control system 100 through any suitable wireless communications protocol.

In the illustrated embodiment, the sensor(s) 37 is configured to provide data and/or signals associated with load condition changes. In such an embodiment, the load condition data/signals may be periodically captured and transmitted to the turbine control system 100 to allow for continuous or active monitoring of the load conditions alongside other sensor data inputs such as wind conditions. For example, load condition measurements captured by the sensor(s) 37 may be stored within and analyzed by the turbine control system 100 to evaluate if the yawing moment, for example, exceeds a load threshold, e.g., exceeds 2500 kNm for about ten seconds or longer, or exceeds about 3500 kNm for about 3 seconds or longer, or exceeds about 5000 kNm for about 1 second or longer, or any combination or range established based on the above.

Figure 7:
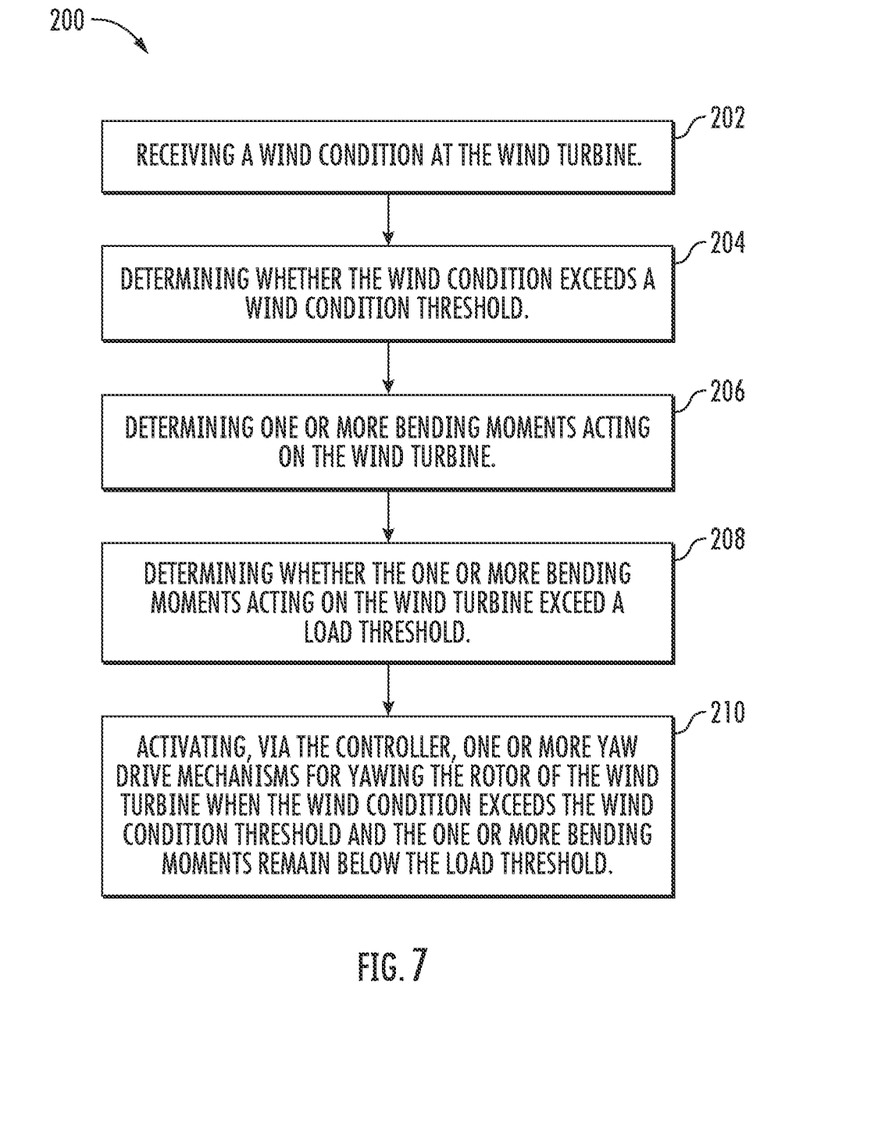
FIG. 7 illustrates a flow diagram of an embodiment of a method for yaw control of a wind turbine according to the present disclosure.

Referring now to FIG. 7, a flow diagram of an embodiment of a method for autonomous yaw control of a wind turbine. In particular, the method 200 can be used to control and/or yaw the nacelle 16 of the wind turbine 10 of FIGS. 1-6, or to yaw any other equivalent or similar system. In this regard, for example, the controller 26 of FIG. 3, the distributed control system 100 of FIG. 4, or the individual I/O modules 104, 106, 108 of FIG. 5 may be configured for implementing the method 200. However, it should be appreciated that the method 200 is discussed herein only to describe aspects of the present disclosure and is not intended to be limiting.

Further, though FIG. 7 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the wind turbine 10 as an example, it should be appreciated that these methods may be applied to the operation of any turbine in wind conditions calling for a yawing control action.

In particular, as shown at (202), the method 200 includes receiving, via the controller, a wind condition at the wind turbine. In certain embodiments, the method 200 includes measuring, via one or more wind sensor, one or more wind conditions.

As shown at (204), the method 200 also includes determining, via the controller, whether the wind condition exceeds a wind condition threshold.

As shown at (206), the method 200 also includes determining, via the controller, one or more bending moments acting on the wind turbine. In certain embodiments, the method also includes measuring, via a load sensor system, one or more bending moments acting on the nacelle in at least one of a nodding direction or a yawing direction.

As shown at (208), the method 200 also includes determining, via the controller, whether the one or more bending moments acting on the wind turbine exceed a load threshold.

As shown at (210), the method 200 also includes activating, via the controller, one or more yaw drive mechanisms for yawing the rotor of the wind turbine when the wind condition exceeds the wind condition threshold and the one or more bending moments remain below the load threshold. In certain embodiments, the method 200 also includes determining, via the controller, a control action signal for the yaw control system as a function of the one or more wind conditions, wherein the control action signal comprises a predetermined angular position for the nacelle. In certain embodiments, the method 200 also includes controlling, via the controller, the yaw control system based on the control action signal for as long as the one or more bending moments remain below the load threshold.

Further aspects of the present disclosure are provided by the subject matter of the following clauses:

Clause 1. A method for yawing a rotor of a wind turbine under autonomous control, the wind turbine having a nacelle mounted atop a tower, the method comprising: receiving, via a controller, a wind condition at the wind turbine;

determining, via the controller, whether the wind condition exceeds a wind condition threshold;
determining, via the controller, one or more bending moments acting on the wind turbine;
determining, via the controller, whether the one or more bending moments acting on the wind turbine exceed a load threshold; and
activating, via the controller, one or more yaw drive mechanisms for yawing the rotor of the wind turbine when the wind condition exceeds the wind condition threshold and the one or more bending moments remain below the load threshold.

Clause 2. The method of clause 1, wherein the wind turbine under autonomous control comprises the wind turbine being in an idling state, a parked state, a shutdown state, a reduced operation state, or a maintenance state, the method further comprising activating, via the controller, autonomous control of the yaw system of the wind turbine.

Clause 3. The method of any of the proceeding clauses, wherein receiving the wind condition at the wind turbine comprises:
receiving, via the controller, a sensor signal from one or more wind speed sensors; and
determining, via the controller, wind speed and wind direction as a function of the sensor signal.

Clause 4. The method of any of the proceeding clauses, wherein determining the one or more load conditions acting on the wind turbine comprises:
receiving, via the controller, a sensor signal from one or more load sensors; and
determining, via the controller, the bending moment as a function of the sensor signal.

Clause 5. The method of clause 4, wherein determining the bending moment as a function of the sensor signal comprises determining, via the controller, one or more bending moments in at least one of a nodding direction or a yawing direction.

Clause 6. The method of clause 5, wherein the load threshold is about 2500 kNm.

Clause 7. The method of any of the proceeding clauses, wherein determining one or more bending moments acting on the wind turbine comprises:
receiving, via the controller, a proximity sensor signal from one or more proximity sensors for a main shaft flange of the nacelle; and
determining, via the controller, the one or more bending moments in at least one of a nodding direction or a yawing direction as a function of the proximity sensor signal.

Clause 8. The method of any of the proceeding clauses, wherein the load threshold is about 2500 kNm.

Clause 9. The method of any of the proceeding clauses, further comprising:
monitoring, via the controller, the one or more bending moments acting on the wind turbine after activating the one or more yaw drive mechanisms of the wind turbine; and
deactivating, via the controller, the one or more yaw drive mechanisms when the one or more bending moments exceed the load threshold.

Clause 10. A method for autonomous yaw control of a wind turbine, the wind turbine having a nacelle mounted atop a tower and a yaw control system for yawing the nacelle, the method comprising:
measuring, via one or more wind sensor, one or more wind conditions;
determining, via the controller, a control action signal for the yaw control system as a function of the one or more wind conditions, wherein the control action signal comprises a predetermined angular position for the nacelle;
measuring, via a load sensor system, one or more bending moments acting on the nacelle in at least one of a nodding direction or a yawing direction;
determining, via the controller, whether the one or more bending moments exceed a load threshold; and
controlling, via the controller, the yaw control system based on the control action signal for as long as the one or more bending moments remain below the load threshold.

Clause 11. The method of clause 10, further comprising determining, via the controller, an operational state of the wind turbine, wherein the control action signal for the yaw control system also is as a function of the operational state.

Clause 12. The method of any of clauses 10-11, wherein the operation state of the wind turbine comprises at least one of an idling state, a parked state, a shutdown state, a reduced operation state, or a maintenance state.

Clause 13. The method of any of clauses 10-12, wherein measuring one or more wind conditions at the wind turbine comprises:
receiving, via the controller, a sensor signal from the one or more wind sensors; and
determining, via the controller, wind speed and wind direction as a function of the sensor signal.

Clause 14. The method of any of clauses 10-13, wherein measuring one or more bending moments comprises:
receiving, via the controller, a load sensor signal from the load sensor system; and
determining, via the controller, the one or more bending moments as a function of the load sensor signal.

Clause 15. The method of clause 14, wherein the load threshold is about 2500 kNm.

Clause 16. The method of any of clauses 10-15, wherein measuring the one or more bending moments comprises:
receiving, at the controller, a proximity sensor signal from one or more proximity sensors for a main shaft flange of the nacelle; and
determining, via the controller, one or more bending moments as a function of the proximity sensor signal.

Clause 17. The method of any of clauses 10-16, wherein the load threshold is about 2500 kNm.

Clause 18. The method of any of clauses 10-17, further comprising:
monitoring, via the controller, the one or more bending moments during the controlling of the yaw control system based on the control action signal; and
modifying, via the controller, the control action signal when the one or more bending moments exceed the load threshold.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for yawing a rotor of a wind turbine under autonomous control, the wind turbine having a nacelle mounted atop a tower, the method comprising:
   receiving, via a controller, a wind condition at the wind turbine;
   determining, via the controller, whether the wind condition exceeds a wind condition threshold;
   determining, via the controller, one or more bending moments acting on the wind turbine;
   determining, via the controller, whether the one or more bending moments acting on the wind turbine exceed a load threshold;
   activating, via the controller, one or more yaw drive mechanisms for yawing the rotor of the wind turbine when the wind condition exceeds the wind condition threshold and the one or more bending moments remain below the load threshold
   monitoring, via the controller, the one or more bending moments acting on the wind turbine after activating the one or more yaw drive mechanisms of the wind turbine; and
   deactivating, via the controller, the one or more yaw drive mechanisms when the one or more bending moments exceed the load threshold.

2. The method of claim 1, wherein the wind turbine under autonomous control comprises the wind turbine being in an idling state, a parked state, a shutdown state, a reduced operation state, or a maintenance state, the method further comprising activating, via the controller, autonomous control of a yaw system of the wind turbine.

3. The method of claim 1, wherein receiving the wind condition at the wind turbine comprises:
   receiving, via the controller, a sensor signal from one or more wind speed sensors; and determining, via the controller, wind speed and wind direction as a function of the sensor signal.

4. The method of claim 1, wherein determining the one or more load conditions acting on the wind turbine comprises:
   receiving, via the controller, a sensor signal from one or more load sensors; and determining, via the controller, the bending moment as a function of the sensor signal.

5. The method of claim 4, wherein determining the bending moment as a function of the sensor signal comprises determining, via the controller, one or more bending moments in at least one of a nodding direction or a yawing direction.

6. The method of claim 5, wherein the load threshold is about 2500 kNm.

7. The method of claim 1, wherein determining one or more bending moments acting on the wind turbine comprises:
   receiving, via the controller, a proximity sensor signal from one or more proximity sensors for a main shaft flange of the nacelle; and
   determining, via the controller, the one or more bending moments in at least one of a nodding direction or a yawing direction as a function of the proximity sensor signal.

8. The method of claim 1, wherein the load threshold is about 2500 kNm.

9. A method for autonomous yaw control of a wind turbine, the wind turbine having a nacelle mounted atop a tower and a yaw control system for yawing the nacelle, the method comprising:
   measuring, via one or more wind sensors, one or more wind conditions;
   determining, via a controller, a control action signal for the yaw control system as a function of the one or more wind conditions, wherein the control action signal comprises a predetermined angular position for the nacelle;
   measuring, via a load sensor system, one or more bending moments acting on the nacelle in at least one of a nodding direction or a yawing direction;
   determining, via the controller, whether the one or more bending moments exceed a load threshold;
   controlling, via the controller, the yaw control system based on the control action signal for as long as the one or more bending moments remain below the load threshold;
   monitoring, via the controller, the one or more bending moments during the controlling of the yaw control system based on the control action signal; and
   modifying, via the controller, the control action signal when the one or more bending moments exceed the load threshold.

10. The method of claim 9, further comprising determining, via the controller, an operational state of the wind turbine, wherein the control action signal for the yaw control system also is as a function of the operational state.

11. The method of claim 10, wherein the operation state of the wind turbine comprises at least one of an idling state, a parked state, a shutdown state, a reduced operation state, or a maintenance state.

12. The method of claim 9, wherein measuring one or more wind conditions at the wind turbine comprises:
   receiving, via the controller, a sensor signal from the one or more wind sensors; and determining, via the controller, wind speed and wind direction as a function of the sensor signal.

13. The method of claim 9, wherein measuring one or more bending moments comprises:
   receiving, via the controller, a load sensor signal from the load sensor system; and
   determining, via the controller, the one or more bending moments as a function of the load sensor signal.

14. The method of claim 13, wherein the load threshold is about 2500 kNm.

15. The method of claim 9, wherein measuring the one or more bending moments comprises:
   receiving, at the controller, a proximity sensor signal from one or more proximity sensors for a main shaft flange of the nacelle; and
   determining, via the controller, one or more bending moments as a function of the proximity sensor signal.

16. The method of claim 9, wherein the load threshold is about 2500 kNm.

* * * * *